(12) United States Patent
Cariou et al.

(10) Patent No.: US 9,893,906 B2
(45) Date of Patent: Feb. 13, 2018

(54) MULTICAST NEGATIVE ACKNOWLEDGEMENTS USING HIGH-ENERGY LONG-TRAINING FIELDS FOR FEEDBACK

(71) Applicant: Intel IP Corporation, Santa Clara, CA (US)

(72) Inventors: Laurent Cariou, Portland, OR (US); Dibakar Das, Hilsboro, OR (US); Yaron Alpert, Hod Hasharoni (IL); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 109 days.

(21) Appl. No.: 14/971,422

(22) Filed: Dec. 16, 2015

(65) Prior Publication Data

US 2017/0063562 A1    Mar. 2, 2017

Related U.S. Application Data

(60) Provisional application No. 62/212,040, filed on Aug. 31, 2015.

(51) Int. Cl.
| | |
|---|---|
| *H04L 12/18* | (2006.01) |
| *H04W 72/00* | (2009.01) |
| *H04B 7/0452* | (2017.01) |
| *H04L 5/00* | (2006.01) |
| *H04L 1/16* | (2006.01) |

(Continued)

(52) U.S. Cl.
CPC ........ *H04L 12/189* (2013.01); *H04B 7/0452* (2013.01); *H04L 1/1685* (2013.01); *H04L 5/0051* (2013.01); *H04L 5/0055* (2013.01); *H04L 12/1868* (2013.01);
(Continued)

(58) Field of Classification Search
CPC ... H04L 12/189; H04L 1/1671; H04L 5/0051; H04L 5/0055; H04L 12/1868; H04B 7/0452; H04W 72/005; H04W 84/12
See application file for complete search history.

(56) References Cited

U.S. PATENT DOCUMENTS

| | | | |
|---|---|---|---|
| 2012/0088533 A1* | 4/2012 | Khoshnevis | H04L 1/0026 455/509 |
| 2013/0329661 A1* | 12/2013 | Chen | H04W 72/0453 370/329 |

(Continued)

*Primary Examiner* — Duc C Ho
(74) *Attorney, Agent, or Firm* — Schwegman Lundberg & Woessner, P.A.

(57) ABSTRACT

Apparatuses, computer readable media, and methods for multicast negative acknowledgements using high-energy long-training fields for feedback are disclosed. An apparatus of a wireless device is disclosed. The apparatus includes memory and processing circuitry coupled to the memory where the processing circuitry configured to: encode one or more packets in accordance with multicast or broadcast, cause to be transmitted the one or more packets to one or more stations, and decode feedback from the one or more stations. The feedback may be received simultaneously on a same resource block for each packet of the one or more packets. Each packet may be represented by one resource block of the one or more resource blocks. The resource blocks may be thirty-six resource blocks per 20 MHz subchannel with nine resource blocks in a frequency domain by four spatial streams.

25 Claims, 5 Drawing Sheets

(51) Int. Cl.
*H04W 84/12* (2009.01)
*H04L 1/00* (2006.01)

(52) U.S. Cl.
CPC ... *H04W 72/005* (2013.01); *H04L 2001/0093* (2013.01); *H04W 84/12* (2013.01)

(56) References Cited

U.S. PATENT DOCUMENTS

| | | | |
|---|---|---|---|
| 2014/0024386 A1* | 1/2014 | Novak | H04W 72/082 455/452.1 |
| 2016/0080115 A1* | 3/2016 | Josiam | H04L 5/0094 370/329 |
| 2016/0119762 A1* | 4/2016 | Zhu | H04W 4/10 370/312 |
| 2016/0205679 A1* | 7/2016 | Yoo | H04L 1/0026 370/329 |
| 2016/0302104 A1* | 10/2016 | Bharadwaj | H04W 28/06 |
| 2016/0360507 A1* | 12/2016 | Cariou | H04W 72/04 |
| 2017/0048048 A1* | 2/2017 | Seok | H04L 5/0055 |

\* cited by examiner

| | STA1 | STA2 | 402 | 404 | 406 |
|---|---|---|---|---|---|
| SN START | NACK | NACK | | SS4 | RBID1 |
| SN START + 1 | ACK | ACK | | SS3 | RBID2 |
| SN START + 2 | ACK | ACK | | SS2 | RBID3 |
| SN START + 3 | ACK | ACK | RU1 | SS1 | RBID4 |
| SN START + 4 | ACK | ACK | | SS4 | RBID5 |
| SN START + 5 | NACK | ACK | | SS3 | RBID6 |
| SN START + 6 | ACK | ACK | | SS2 | RBID7 |
| SN START + 7 | ACK | ACK | RU2 | SS1 | RBID8 |
| SN START + 8 | ACK | ACK | | SS4 | RBID9 |
| SN START + 9 | ACK | ACK | | SS3 | RBID10 |
| SN START + 10 | ACK | ACK | | SS2 | RBID11 |
| SN START + 11 | ACK | ACK | RU3 | SS1 | RBID12 |
| SN START + 12 | ACK | ACK | | SS4 | RBID13 |
| SN START + 13 | ACK | ACK | | SS3 | RBID14 |
| SN START + 14 | ACK | ACK | | SS2 | RBID15 |
| SN START + 15 | ACK | ACK | RU4 | SS1 | RBID16 |
| SN START + 16 | ACK | ACK | | SS4 | RBID17 |
| SN START + 17 | ACK | ACK | | SS3 | RBID18 |
| SN START + 18 | ACK | ACK | | SS2 | RBID19 |
| SN START + 19 | ACK | ACK | RU5 | SS1 | RBID20 |
| SN START + 20 | ACK | ACK | | SS4 | RBID21 |
| SN START + 21 | ACK | ACK | | SS3 | RBID22 |
| SN START + 22 | ACK | ACK | | SS2 | RBID23 |
| SN START + 23 | ACK | ACK | RU6 | SS1 | RBID24 |
| SN START + 24 | ACK | ACK | | SS4 | RBID25 |
| SN START + 25 | ACK | ACK | | SS3 | RBID26 |
| SN START + 26 | ACK | ACK | | SS2 | RBID27 |
| SN START + 27 | ACK | ACK | RU7 | SS1 | RBID28 |
| SN START + 28 | ACK | ACK | | SS4 | RBID29 |
| SN START + 29 | ACK | ACK | | SS3 | RBID30 |
| SN START + 30 | ACK | ACK | | SS2 | RBID31 |
| SN START + 31 | ACK | ACK | RU8 | SS1 | RBID32 |
| SN START + 32 | ACK | ACK | | SS4 | RBID33 |
| SN START + 33 | ACK | ACK | | SS3 | RBID34 |
| SN START + 34 | ACK | ACK | | SS2 | RBID35 |
| SN START + 35 | ACK | ACK | RU9 | SS1 | RBID36 |

FIG. 4

MULTICAST NEGATIVE ACKNOWLEDGEMENTS USING HIGH-ENERGY LONG-TRAINING FIELDS FOR FEEDBACK

PRIORITY CLAIM

This application claims the benefit of priority under 35 USC 119(e) to U.S. Provisional Patent Application Ser. No. 62/212,040, filed Aug. 31, 2015, which is incorporated herein by reference in their entirety.

TECHNICAL FIELD

Embodiments pertain to wireless networks. Some embodiments relate to wireless local area networks (WLANs) and Wi-Fi networks including networks operating in accordance with the IEEE 802.11 family of standards. Some embodiments relate to high-efficiency wireless local-area networks (HEWs). Some embodiments relate to IEEE 802.11ax. Some embodiments relate to methods and devices for multicast acknowledgments or negative acknowledgments.

BACKGROUND

Efficient use of the resources of a wireless local-area network (WLAN) is important to provide bandwidth and acceptable response times to the users of the WLAN. One way to increase the efficiency of a WLAN is allocating a proper resource unit to a station and efficiently retransmitting packets not received properly. Moreover, wireless devices need to operate with both newer protocols and with legacy devices.

BRIEF DESCRIPTION OF THE DRAWINGS

The present disclosure is illustrated by way of example and not limitation in the figures of the accompanying drawings, in which like references indicate similar elements and in which:

FIG. 4 is a table illustrating a mapping between sequence numbers of packets and resource block identifications (RBIDs) in accordance with some embodiments.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
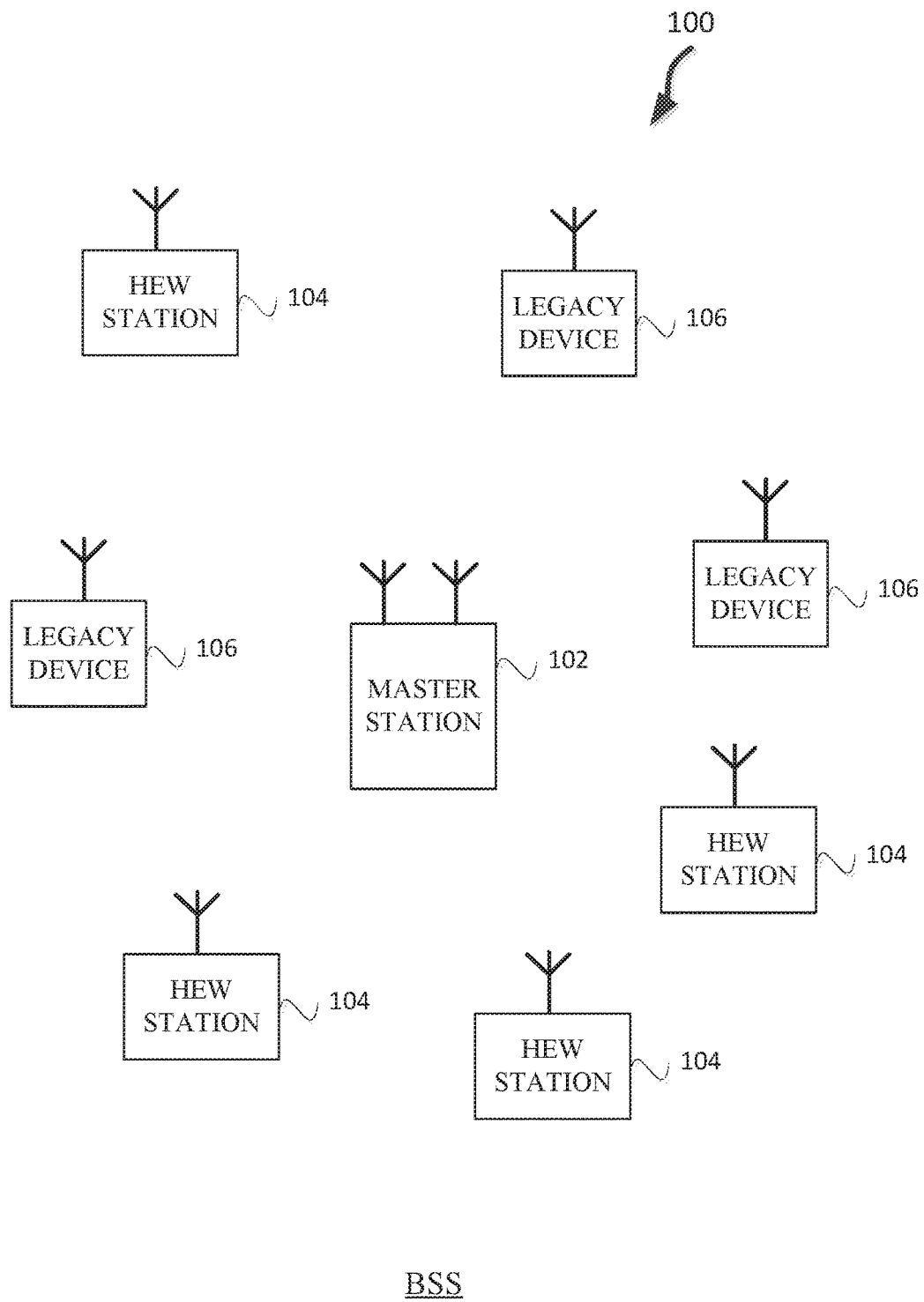
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-4.

Figure 2:
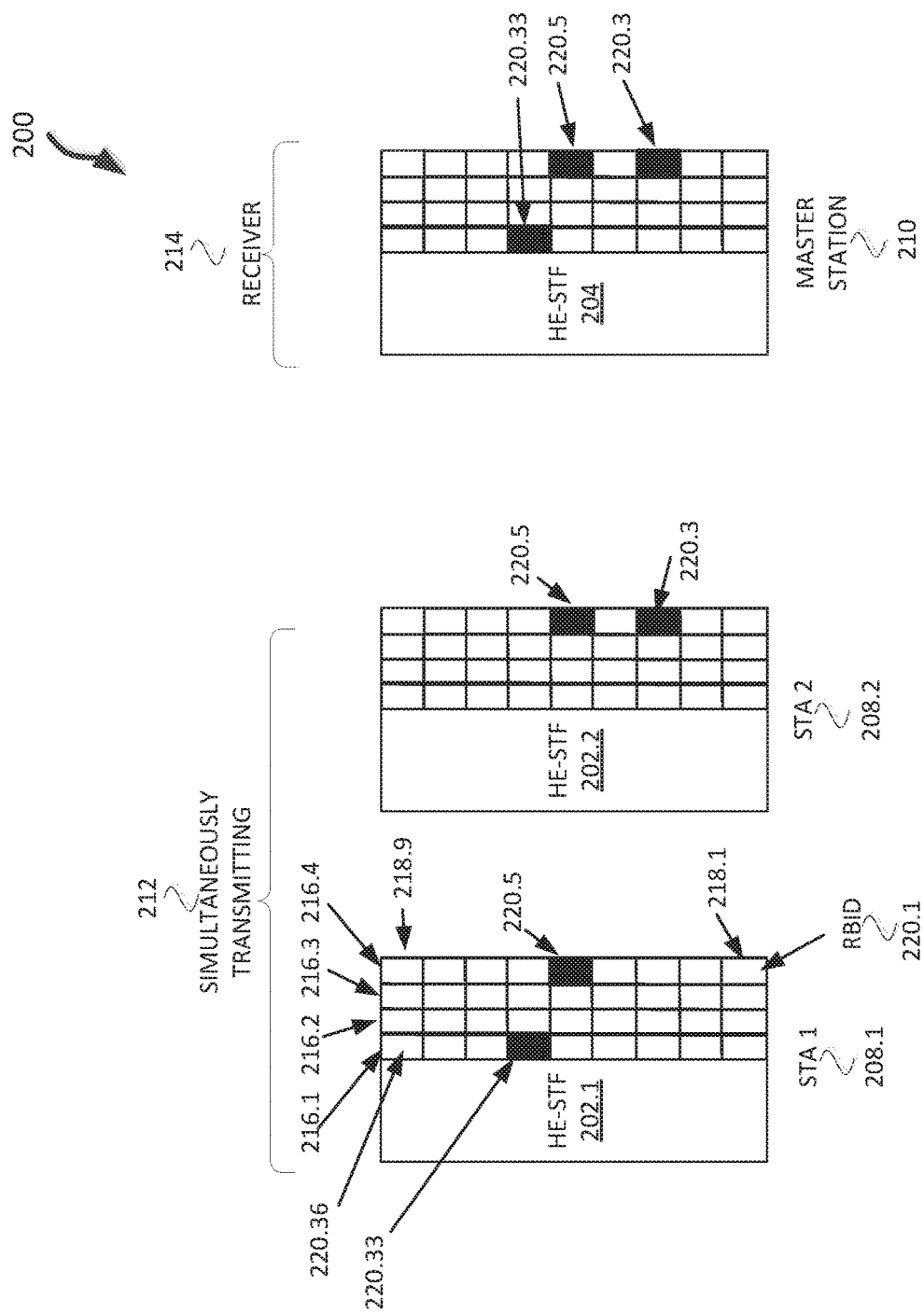
FIG. 2 illustrates stations providing 1-bit feedback to a master station in accordance with some embodiments.

FIG. 2 illustrates stations providing 1-bit feedback to a master station in accordance with some embodiments. Illustrated in FIG. 2 is simultaneous transmission 212 of STA 1 208.1 and STA 2 208.2 that is received by receiver 214 master station 210. STA 1 208.1 and STA 2 208.2 may be HEW stations 104. The master station 210 may be a master station 102 or a HEW station 104.

STA 1 208.1 and STA 2 208.2 are transmitting a high-efficiency short training field (HE-STF) 202 followed by STA 1 208.1 transmitting on resource block identification (RBID) 220.33 and STA 1 208.2 transmitting on RBID 222.3. The RBIDs 220 may be determined by the master station 102, previously agreed upon, or a communication standard. The columns 216.1, 216.2, 216.3, and 216.4 represent different resource blocks which may be spatial streams that may represent the different codes of the HE-LTF P-matrix. The rows 218.1 through 218.9 represent the different resource blocks in the frequency domain. For example, as illustrated, RBIDs may be from 220.1 through 220.36. The rows 218 may be 2 MHz each with 26 data carriers. In some embodiments, the size of the resource blocks 218 may be different. For example, the resource blocks may comprise fewer or more data carriers. In some embodiments, the number of spatial streams may be different. For example, there may be fewer or more spatial streams for fewer or more columns 216.

The receiver 214, which is a master station 102, receives the transmission on RBID 220.33 from STA 1 208.1 and the transmission on RBID 220.3 at the same time. The STAs 208 may transmit simultaneously on the same RBID 220. The RBID 220 may have a meaning assigned to them by the master station 210. For example, as illustrated in FIG. 4, the RBID 220 indicate a negative acknowledgment of a packet. Each RBID 220 may be a 1-bit feedback mechanism. STA 1 208.1 and STA 2 208.2 may transmit simultaneously on the same RBID 220, e.g. both transmit on RBID 220.5, which may indicate that neither STA 1 208.1 nor STA 2 208.2 received a packet correctly.

Figure 3:
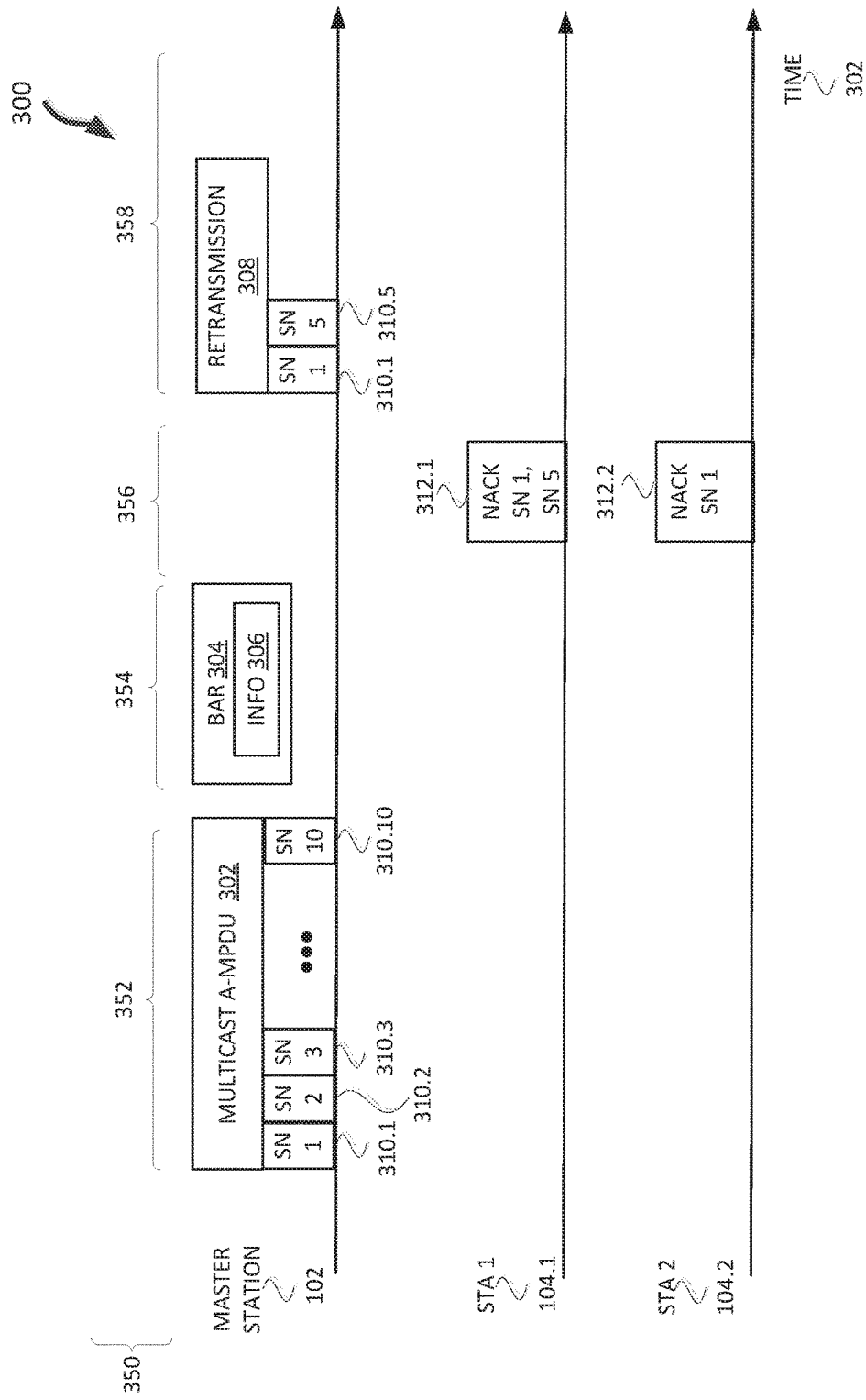
FIG. 3 illustrates a method of multi-cast negative acknowledgment using HE-LTF for feedback in accordance with some embodiments.

FIG. 3 illustrates a method 300 of multi-cast negative acknowledgment using HE-LTF for feedback in accordance with some embodiments. FIG. 4 is a table 400 illustrating a mapping between sequence numbers of packets and resource block identifications (RBIDs) in accordance with some embodiments. FIGS. 3 and 4 will be described in conjunction with one another. Illustrated in FIG. 3 is time 302 along a horizontal axis with transmitter STA 1 104.1, STA 104.2, and master station 102, along a vertical axis. Operations 350 are indicated on the top.

Illustrated in FIG. 4 is a table 400 with sequence number (SN) 310, STA 1 104.1, STA 2 104.2, resource unit (RU) 402, spatial stream (SS) 404, and RBID 406.

The method 300 begins at operation 352 with the master station 102 transmitting a multicast aggregated media access control protocol data unit (A-MPDU) 302. Although, the method 300 illustrates an A-MPDU 302 any multicast or broadcast packet may be used in the method 300.

The A-MPDU 302 comprises a number of MPDUs with SN 1 310.1 through 310.10. The A-MPDU 302 may include more or fewer packets and SN 310. The method 300 continues at operation 354 with the master station 102 transmitting a block acknowledgement request (BAR) 304. The BAR 304 may include information 306. The information 306 may include an indication for the STAs 104 to use a HE-LTF mode, an indication of the number of packets transmitted, and an indication to negatively acknowledge packets not received.

In some embodiments, the method 300 does not include operation 354. The STAs 104 transmit the NACKs after operation 352.

The method 300 continues with operation 356 with STA 1 104.1 transmitting NACK 312.1 and STA 2 104.2 transmitting NACK 312.2. STA 1 104.1 and STA 2 104.2 transmit simultaneously as described in conjunction with FIG. 2. STA 1 104.1 may include an indication that SN 1 301.1 and SN 5 301.5 were not received. For example, in table 400 STA 1 104.1 sends a NACK at 310.1 and a NACK at 310.5. The STA 1 104.1 sends the NACK on RBID 1 406, which in the table 400 is a fourth SS (SS4) 404 and a frequency RU of a first RU (RU1) 402. Each RU 402 may be 26 data carriers of a 20 MHz subchannel. The number of data carriers and the bandwidth of the subchannel may be different and/or there may be more than one subchannel. Table 400 may be used to determine a RBID 406 based on a SN 310. The mapping between the RBIDs 406 and SNs 310 may be determined by the master station 102 and may be indicated to the STAs 104 in the information 306. In some embodiments, the mapping between the RBIDs 406 and SNs 310 may be indicated in a beacon frame, or another frame before the multicast A-MPDU 302. In some embodiments, the mapping between the RBIDs 406 and SNs 310 may be predefined. Each RBID 406 may be used as a one-bit feedback for a packet with the SN 310. In some embodiments multiple RBIDs 406 may be assigned to a SN 310 to increase reliability. In some embodiments, multiple NACK or ACK sequences may be triggered to increase reliability. One trigger (e.g., BAR 304) may trigger multiple NACK or ACK sequences or multiple triggers may be used.

The master station 102 receives the NACK 312.1 and NACK 312.2. The master station 102 detects that RBID1 and RBID6 have energy, so the master station 102 determines that it needs to retransmit SN 1 310.1 and SN 5 310.5. The method 300 continues at operation 358 with the master station 102 retransmitting a retransmission 308. The retransmission 308 includes the packets with SN 1 301.1 and SN 301.5 that were NACK'ed by the STAs 104. In some embodiments, the method 300 may continue with another BAR 304.

In some embodiments, legacy STAs 106 may receive the multicast A-MPDU 302. The master station 102 may be configured to perform the method 300 and to perform legacy methods to receive acknowledgements from the legacy devices 106.

In some embodiments, method 300 may request acknowledgements and the STAs 104 may acknowledge which packets have been received. In some embodiments, the master station 102 may allocate different portions of the RBIDs 406 for each STA 104 to acknowledge a received packet or received packets.

The method 300 may be for a single NACK, block NACK, a single ACK, or block ACK. The RBIDs 406 may be allocated accordingly. The NACK block NACK, ACK, and/or block ACK feedbacks can be, for example, (1) an immediate feedback, negotiated beforehand to be transmitted (e.g., short interframe space SIFS time) after the end of the broadcast or multicast packet; (2) a scheduled feedback, triggered by a BAR (bloc NACK request) the AP detects if energy has been transmitted on each RBID (if one or multiple STAs did transmit energy to indicate a NACK, the result is the same: the AP needs to retransmit).

In some embodiments, the spatial streams are determined by a P-matrix which may be used to select one of four spatial streams that may be used to transmit the HE-LTF.

The protocol overhead may be independent of the number of packets that are being ACK'ed or NACK'ed since the STAs 104 simultaneously transmit using assigned RBIDs. In some embodiments, reliable multicast/broadcast mechanisms are unreliable because it may be difficult to receive feedback (e.g., acknowledgement or negative acknowledgment) from the receiver. Some embodiments use a reliable multicast/broadcast (closed loop) method based on the simultaneous feedback mechanism (for example the 1-bit feedback mechanism using an assigned resource block) in order to enable reliable simultaneous efficient acknowledgement (ACKs/NACKs) from multiple destination HEW stations 104.

Figure 5:
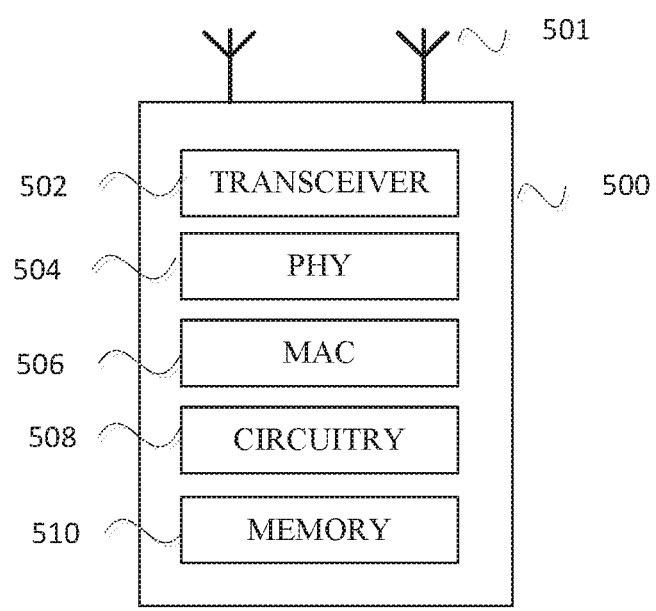
FIG. 5 illustrates a HEW device in accordance with some embodiments.

FIG. 5 illustrates a HEW device 500 in accordance with some embodiments. HEW device 500 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 500 may be suitable for operating as master station 102 (FIG. 1) or a HEW STA 104 (FIG. 1). In accordance with embodiments, HEW device 500 may include, among other things, a transmit/receive element 501 (for example an antenna), a transceiver 502, physical (PHY) circuitry 504, and media access control (MAC) circuitry 506. PHY circuitry 504 and MAC circuitry 506 may be HEW compliant layers and may also be compliant with one or more legacy IEEE 802.13 standards. MAC circuitry 506 may be arranged to configure packets such as a physical layer convergence procedure (PLCP) protocol data unit (PPDUs) and arranged to transmit and receive PPDUs, among other things. HEW device 500 may also include circuitry 508 and memory 510 configured to perform the various operations described herein. The circuitry 508 may be coupled to the transceiver 502, which may be coupled to the transmit/receive element 501. While FIG. 5 depicts the circuitry 508 and the transceiver 502 as separate components, the circuitry 508 and the transceiver 502 may be integrated together in an electronic package or chip.

In some embodiments, the MAC circuitry 506 may be arranged to contend for a wireless medium during a contention period to receive control of the medium for the HEW control period and configure an HEW PPDU. In some embodiments, the MAC circuitry 506 may be arranged to contend for the wireless medium based on channel contention settings, a transmitting power level, and a CCA level.

The PHY circuitry 504 may be arranged to transmit the HEW PPDU. The PHY circuitry 504 may include circuitry for modulation/demodulation, upconversion/downconversion, filtering, amplification, etc. In some embodiments, the circuitry 508 may include one or more processors. The circuitry 508 may be configured to perform functions based on instructions being stored in a RAM or ROM, or based on special purpose circuitry. The circuitry 508 may include processing circuitry and/or transceiver circuitry in accordance with some embodiments. The circuitry 508 may include a processor such as a general purpose processor or special purpose processor. The circuitry 508 may implement one or more functions associated with transmit/receive elements 501, the transceiver 502, the PHY circuitry 504, the MAC circuitry 506, and/or the memory 510.

In some embodiments, the circuitry 508 may be configured to perform one or more of the functions and/or methods described herein and/or in conjunction with FIGS. 1-5 such as decoding or encoding LDPCs with a larger code word size than legacy LDPCs code word sizes.

In some embodiments, the transmit/receive elements 501 may be two or more antennas that may be coupled to the PHY circuitry 504 and arranged for sending and receiving signals including transmission of the HEW packets. The transceiver 502 may transmit and receive data such as HEW PPDU and packets that include an indication that the HEW device 500 should adapt the channel contention settings according to settings included in the packet. The memory 510 may store information for configuring the other circuitry to perform operations for configuring and transmitting HEW packets and performing the various operations to perform one or more of the functions and/or methods described herein and/or in conjunction with FIGS. 1-5.

In some embodiments, the HEW device 500 may be configured to communicate using OFDM communication signals over a multicarrier communication channel. In some embodiments, HEW device 500 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 500 may use 4× symbol duration of 802.11n or 802.11ac.

In some embodiments, an HEW device 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 501 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus of an access point. The apparatus comprising memory and processing circuitry couple to the memory. The processing circuitry configured to: encode one or more packets in accordance with multicast or broadcast; configure the access point for transmission of the one or more packets to one or more stations; and decode feedback from the one or more stations, the feedback to be received simultaneously on a same resource block for each packet of the one or more packets, wherein each packet is represented by one resource block of the one or more resource blocks, and wherein the resource block comprises a frequency resource allocation.

In Example 2, the subject matter of Example 1 can optionally include where the processing circuitry is further configured to: retransmit to the one or more stations packets of the one or more packets that were not received as indicated by the feedback, wherein the retransmit is to be in accordance with the multicast or broadcast.

In Example 3, the subject matter of Examples 1 or 2 can optionally include where the one or more packets are media access control protocol data units (MPDUs) or an aggregate MPDU (A-MPDU).

In Example 4, the subject matter of any of Examples 1-3 can optionally include where one resource block is assigned to each of the one or more packets for each of the one or more stations to use, and wherein energy on the resource block indicates a negative acknowledgment of the corresponding packet from at least one of the one or more stations.

In Example 5, the subject matter of any of Examples 1-4 can optionally include where the resource block further comprises a spatial stream allocation.

In Example 6, the subject matter of any of Examples 1-5 can optionally include where the frequency resource allocation and the spatial stream allocation are part of a high-efficiency long-training field (HE-LTF).

In Example 7, the subject matter of any of Examples 1-6 can optionally include where one resource block is assigned to each of the one or more packets, and wherein energy on the resource block indicates an acknowledgment of the corresponding packet from at least one station of the one or more stations.

In Example 8, the subject matter of any of Examples 1-7 can optionally include where the one or more resource blocks comprise thirty-six resource blocks per 20 MHz subchannel with 9 resource blocks in a frequency domain by four spatial streams.

In Example 9, the subject matter of any of Examples 1-8 can optionally include where the processing circuitry is further configured to encode a packet with a resource block assignment for the feedback.

In Example 10, the subject matter of Example 9 can optionally include where the processing circuitry is further configured to: encode a block acknowledgment request or block negative acknowledgment request; and cause the block acknowledgement or block negative acknowledgment to be transmitted.

In Example 11, the subject matter of Examples 11 can optionally include where the block acknowledgment request or the negative block acknowledgment request comprises one or more of an indication that the one or more stations are to provide feedback simultaneously on one or more resource blocks, and an indication of a number of packets the one or more stations are to provide feedback for.

In Example 12, the subject matter of Example 10 can optionally include where the processing circuitry is further configured to: transmit a legacy block acknowledgement or a legacy negative block acknowledgment.

In Example 13, the subject matter of any of Examples 1-12 can optionally include where the access point and the one or more stations are each one from the following group: an access point, an Institute of Electrical and Electronic Engineers (IEEE) 802.11ax access point, an IEEE 802.11ax station, and a station.

In Example 14, the subject matter of any of Examples 1-13 can optionally include where processing circuitry is further configured to: cause the one or more packets to be transmitted in accordance with orthogonal division multiple-access (OFDMA) and in accordance with multiple-user multiple-input multiple-output (MU-MIMO).

In Example 15, the subject matter of any of Examples 1-14 can optionally include one or more antenna couple to the processing circuitry.

Example 16 is a non-transitory computer-readable storage medium that stores instructions for execution by one or more processors. The instructions to configure the one or more processors to cause an access point to: encode one or more packets in accordance with multicast or broadcast; cause to be transmitted the one or more packets to one or more stations; and decode feedback from the one or more stations, the feedback to be received simultaneously on one or more resource blocks, wherein each packet of the one or more packets is represented by at least one resource block of the one or more resource blocks, and wherein the resource block comprises a frequency resource allocation.

In Example 17, the subject matter of Example 16 can optionally include where the instructions cause the wireless device to: cause to be retransmitted to the one or more stations packets of the one or more packets that were not received as indicated by the feedback, wherein the retransmit is to be in accordance with the multicast or broadcast.

In Example 18, the subject matter of Examples 16 or 17 can optionally include where the one or more packets are media access control protocol data units (MPDUs) or an aggregate MPDU (A-MPDU).

In Example 19, the subject matter of any of Examples 16-18 can optionally include where one resource block is assigned to each of the one or more packets, and wherein energy on the resource block indicates a negative acknowledgment of the corresponding packet from at least one station of the one or more stations, and wherein the resource block further comprises a spatial stream allocation.

Example 20 is a method performed by an access point. The method comprising: encoding one or more packets in accordance with multicast or broadcast; transmitting the one or more packets to one or more stations; and decoding feedback from the one or more stations, the feedback to be received simultaneously on one or more resource blocks, wherein each packet of the one or more packets is represented by at least one resource block of the one or more resource blocks, and wherein the resource block comprises a frequency resource allocation.

In Example 21, the subject matter of Example 20 can optionally include where the method further comprises: retransmitting to the one or more stations packets of the one or more packets that were not received as indicated by the feedback, wherein the retransmit is to be in accordance with the multicast or broadcast, wherein one resource block is assigned to each of the one or more packets, and wherein energy on the resource block indicates a negative acknowledgment of the corresponding packet from at least one station of the one or more stations, and wherein the resource block further comprises a spatial stream allocation.

Example 22 is an apparatus of a station, the apparatus comprising memory and processing circuitry couple to the memory. The processing circuitry configured to: decode one or more packets; encode feedback, the feedback to be transmitted on one or more resource blocks, wherein each packet of the one or more packets is represented by at least one resource block of the one or more resource blocks, and wherein the resource block comprises a frequency resource allocation and a spatial stream allocation.

In Example 23, the subject matter of Example 2 can optionally include where one resource block is assigned to each of the one or more packets, and wherein energy on the resource block indicates a negative acknowledgment of the corresponding packet from the wireless device.

In Example 24, the subject matter of Examples 22 or 23 can optionally include where the frequency resource allocation and the spatial stream allocation are part of a high-efficiency long-training field (HE-LTF).

In Example 25, the subject matter of any of Examples 22-24 can optionally include one or more antenna couple to the processing circuitry.

Example 26 is an apparatus of an access point. The apparatus comprising: means for encoding one or more packets in accordance with multicast or broadcast; means for configuring the access point for transmission of the one or more packets to one or more stations; and means for decoding feedback from the one or more stations, the feedback to be received simultaneously on a same resource block for each packet of the one or more packets, wherein each packet is represented by one resource block of the one or more resource blocks, and wherein the resource block comprises a frequency resource allocation.

In Example 27, the subject matter of Example 26 can optionally include means for retransmitting to the one or more stations packets of the one or more packets that were not received as indicated by the feedback, wherein the retransmit is to be in accordance with the multicast or broadcast.

In Example 28, the subject matter of Examples 26 or 27 can optionally include where the one or more packets are media access control protocol data units (MPDUs) or an aggregate MPDU (A-MPDU).

In Example 29, the subject matter of any of Examples 26-28 can optionally include where one resource block is assigned to each of the one or more packets for each of the one or more stations to use, and wherein energy on the resource block indicates a negative acknowledgment of the corresponding packet from at least one of the one or more stations.

In Example 30, the subject matter of any of Examples 26-29 can optionally include where the resource block further comprises a spatial stream allocation.

In Example 31, the subject matter of Example 30 can optionally include where the frequency resource allocation and the spatial stream allocation are part of a high-efficiency long-training field (HE-LTF).

In Example 32, the subject matter of any of Examples 26-31 can optionally include where one resource block is assigned to each of the one or more packets, and wherein energy on the resource block indicates an acknowledgment of the corresponding packet from at least one station of the one or more stations.

In Example 33, the subject matter of any of Examples 26-32 can optionally include where the one or more resource blocks comprise thirty-six resource blocks per 20 MHz subchannel with 9 resource blocks in a frequency domain by four spatial streams.

In Example 34, the subject matter of any of Examples 26-33 can optionally include means for encoding a packet with a resource block assignment for the feedback.

In Example 35, the subject matter of Example 34 can optionally include means for encoding a block acknowledgment request or block negative acknowledgment request; and means for causing the block acknowledgement or block negative acknowledgment to be transmitted.

In Example 36, the subject matter of Example 35 can optionally include where the block acknowledgment request or the negative block acknowledgment request comprises one or more of an indication that the one or more stations are to provide feedback simultaneously on one or more resource blocks, and an indication of a number of packets the one or more stations are to provide feedback for.

In Example 37, the subject matter of Example 36 can optionally include means for transmitting a legacy block acknowledgement or a legacy negative block acknowledgment.

In Example 38, the subject matter of any of Examples 26-37 can optionally include where the access point and the one or more stations are each one from the following group: an access point, an Institute of Electrical and Electronic Engineers (IEEE) 802.11ax access point, an IEEE 802.11ax station, and a station.

In Example 39, the subject matter of any of Examples 26-38 can optionally include cause the one or more packets to be transmitted in accordance with orthogonal division multiple-access (OFDMA) and in accordance with multiple-user multiple-input multiple-output (MU-MIMO).

In Example 40, the subject matter of any of Examples 26-39 can optionally include means for transmitting and receiving radio signals.

Example 41 is an apparatus of a station. The apparatus comprising: means for decoding one or more packets; means for encoding feedback, the feedback to be transmitted on one or more resource blocks, wherein each packet of the one or more packets is represented by at least one resource block of the one or more resource blocks, and wherein the resource block comprises a frequency resource allocation and a spatial stream allocation.

In Example 42, the subject matter of Example 41 can optionally include where one resource block is assigned to each of the one or more packets, and wherein energy on the resource block indicates a negative acknowledgment of the corresponding packet from the wireless device.

In Example 43, the subject matter of Examples 41 or 42 can optionally include where the frequency resource allocation and the spatial stream allocation are part of a high-efficiency long-training field (HE-LTF).

In Example 44, the subject matter of any of Examples 41-43 can optionally include means for transmitting and receiving radio signals.

Example 45 is a method performed by a station. The method comprising: decoding one or more packets; encoding feedback, the feedback to be transmitted on one or more resource blocks, wherein each packet of the one or more packets is represented by at least one resource block of the one or more resource blocks, and wherein the resource block comprises a frequency resource allocation and a spatial stream allocation.

In Example 46, the subject matter of Example 45 can optionally include where one resource block is assigned to each of the one or more packets, and wherein energy on the resource block indicates a negative acknowledgment of the corresponding packet from the wireless device.

In Example 47, the subject matter of Examples 45 or 46 can optionally include where the frequency resource allocation and the spatial stream allocation are part of a high-efficiency long-training field (HE-LTF).

Example 48 is a non-transitory computer-readable storage medium that stores instructions for execution by one or more processors. The instructions to configure the one or more processors to cause an access point to: decode one or more packets; encode feedback, the feedback to be transmitted on one or more resource blocks, wherein each packet of the one or more packets is represented by at least one resource block of the one or more resource blocks, and wherein the resource block comprises a frequency resource allocation and a spatial stream allocation.

In Example 49, the subject matter of Example 48 can optionally include where one resource block is assigned to each of the one or more packets, and wherein energy on the resource block indicates a negative acknowledgment of the corresponding packet from the wireless device.

In Example 50, the subject matter of Examples 48 or 49 can optionally include where the frequency resource allocation and the spatial stream allocation are part of a high-efficiency long-training field (HE-LTF).

The Abstract is provided to comply with 37 C.F.R Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point, the apparatus comprising: memory and processing circuitry couple to the memory, the processing circuitry configured to:
   encode one or more packets in accordance with multicast or broadcast;
   configure the access point for transmission of the one or more packets to one or more stations; and
   decode feedback comprising one or more resource blocks from the one or more stations, the feedback to be received simultaneously from the one or more stations, wherein each resource block of the one or more resource blocks corresponds to feedback for one packet of the one or more packets from each of the one or more stations, and wherein each resource block is one resource block of a thirty-six resource block 20 MHz subchannel allocation comprising nine (9) resource blocks in a frequency domain with four (4) resource blocks in a spatial domain.

2. The apparatus of claim 1, wherein the processing circuitry is further configured to:
   retransmit to the one or more stations packets of the one or more packets that were not received as indicated by the feedback, wherein the retransmit is to be in accordance with the multicast or broadcast.

3. The apparatus of claim 1, wherein the one or more packets are media access control protocol data units (MPDUs) or an aggregate MPDU (A-MPDU).

4. The apparatus of claim 1, wherein energy on a resource block of the one or more resource blocks indicates a negative acknowledgment of the corresponding packet from at least one of the one or more stations.

5. The apparatus of claim 1, wherein the frequency resource allocation and the spatial stream allocation are part of a high-efficiency long-training field (HE-LTF).

6. The apparatus of claim 1, wherein energy on a resource block of the one or more resource blocks indicates an acknowledgment of the corresponding packet from at least one station of the one or more stations.

7. The apparatus of claim 1, wherein the processing circuitry is further configured to encode a packet with a resource block assignment for the feedback.

8. The apparatus of claim 7, wherein the processing circuitry is further configured to:
   encode a block acknowledgment request or block negative acknowledgment request; and cause the block acknowledgement or block negative acknowledgment to be transmitted.

9. The apparatus of claim 8, wherein the block acknowledgment request or the negative block acknowledgment request comprises one or more of an indication that the one or more stations are to provide feedback simultaneously on one or more resource blocks, and an indication of a number of packets the one or more stations are to provide feedback for.

10. The apparatus of claim 8, wherein the processing circuitry is further configured to: transmit a legacy block acknowledgement or a legacy negative block acknowledgment.

11. The apparatus of claim 1, wherein the access point and the one or more stations are each one from the following group: an access point, an Institute of Electrical and Electronic Engineers (IEEE) 802.11ax access point, an IEEE 802.11ax station, and a station.

12. The apparatus of claim 1, wherein processing circuitry is further configured to:
cause the one or more packets to be transmitted in accordance with orthogonal division multiple-access (OFDMA) and in accordance with multiple-user multiple-input multiple-output (MU-MIMO).

13. The apparatus of claim 1, further comprising one or more antenna couple to the processing circuitry.

14. The apparatus of claim 1, wherein the memory is configured to store the one or more packets.

15. A non-transitory computer-readable storage medium that stores instructions for execution by one or more processors, the instructions to configure the one or more processors to cause an access point to:
encode one or more packets in accordance with multicast or broadcast;
cause to be transmitted the one or more packets to one or more stations; and
decode feedback comprising one or more resource blocks from the one or more stations, the feedback to be received simultaneously from the one or more stations, wherein each resource block of the one or more resource blocks corresponds to feedback for one packet of the one or more packets from each of the one or more stations, and wherein each resource block is one resource block of a thirty-six resource block 20 MHz subchannel allocation comprising nine (9) resource blocks in a frequency domain with four (4) resource blocks in a spatial domain.

16. The non-transitory computer-readable storage medium of claim 15, wherein the instructions cause the wireless device to:
cause to be retransmitted to the one or more stations packets of the one or more packets that were not received as indicated by the feedback, wherein the retransmit is to be in accordance with the multicast or broadcast.

17. The non-transitory computer-readable storage medium of claim 15, wherein the one or more packets are media access control protocol data units (MPDUs) or an aggregate MPDU (A-MPDU).

18. The non-transitory computer-readable storage medium of claim 15, wherein energy on a resource block indicates a negative acknowledgment of a corresponding packet from at least one station of the one or more stations.

19. A method performed by an access point, the method comprising:
encoding one or more packets in accordance with multicast or broadcast;
transmitting the one or more packets to one or more stations; and
decoding feedback comprising one or more resource blocks from the one or more stations, the feedback to be received simultaneously from the one or more stations, wherein each resource block of the one or more resource blocks corresponds to feedback for one packet of the one or more packets from each of the one or more stations, and wherein each resource block is one resource block of a thirty-six resource block 20 MHz subchannel allocation comprising nine (9) resource blocks in a frequency domain with four (4) resource blocks in a spatial domain.

20. The method of claim 19, wherein the method further comprises:
retransmitting to the one or more stations packets of the one or more packets that were not received as indicated by the feedback, wherein the retransmit is to be in accordance with the multicast or broadcast, wherein energy on a resource block indicates a negative acknowledgment of a corresponding packet from at least one station of the one or more stations.

21. An apparatus of a station, the apparatus comprising memory and processing circuitry couple to the memory, the processing circuitry configured to:
decode one or more packets;
encode feedback comprising one or more resource blocks, the feedback to be transmitted on one or more resource blocks, wherein each resource block of the one or more resource blocks corresponds to feedback for one packet of the one or more packets, and wherein each resource block is one resource block of a thirty-six resource block 20 MHz subchannel allocation comprising nine (9) resource blocks in a frequency domain with four (4) resource blocks in a spatial domain.

22. The apparatus of claim 21, wherein one resource block is assigned to each of the one or more packets, and wherein energy on the resource block indicates a negative acknowledgment of the corresponding packet from the wireless device.

23. The apparatus of claim 21, wherein the frequency resource allocation and the spatial stream allocation are part of a high-efficiency long-training field (HE-LTF).

24. The apparatus of claim 21, further comprising one or more antenna couple to the processing circuitry.

25. The apparatus of claim 21, wherein the memory is configured to store the one or more packets.

* * * * *